United States Patent [19]

Roszczenko

[11] Patent Number: 5,505,269
[45] Date of Patent: Apr. 9, 1996

[54] SOILWORKING TOOL

[76] Inventor: Janusz Roszczenko, 2050 Fishing Creek Valley Rd., Harrisburg, Pa. 17112

[21] Appl. No.: 229,734

[22] Filed: Apr. 19, 1994

[51] Int. Cl.$^6$ .................................................. A01B 33/02
[52] U.S. Cl. .............................. 172/123; 172/47; 172/439
[58] Field of Search ................................ 172/42, 47, 122, 172/123, 91, 545, 556, 544, 548, 549, 52, 55

[56] References Cited

U.S. PATENT DOCUMENTS 4,142,587  3/1979  Woodward et al. ..................... 172/123
4,838,359  6/1989  Kirch .................................... 172/123

*Primary Examiner*—Eric K. Nicholson
*Assistant Examiner*—Robert Pezzuto
*Attorney, Agent, or Firm*—Aquilino & Welsh

[57] ABSTRACT

The object of the invention is a soilworking rotary machine in which there are kinematic and shape soilworking elements that obtain a cultivation effect to open and turn the soil. The fundamental unit of the machine is the cultivation unit compounded to tillage sections. The tillage sections are built with blades joined to the common holder. The blades are twisted, the holder is cone shaped and tillage sections are positioned at approximately a 450° angle to the direction of linear velocity. The tillage sections, together with a transmission and support wheels, is affixed to the common frame.

11 Claims, 7 Drawing Sheets

SOILWORKING TOOL

BACKGROUND OF THE INVENTION

This invention relates to the agriculture soilworking tools and in particular, to the soilworking rotary machines which open and overturn the soil during the soilworking process.

Heretofore there have been many soilworking tools and machines: these generally consist of two types: which open the soil during the soil working process—for example, active tools such as a rototiller, rotary harrow or inactive tools like a spring tooth harrow or a disk harrow or tools which only overturn the soil during the soilworking process like the plow or disk plow.

The simultaneous opening and overturning of the soil during the soilworking process have been obtained only by joining the tools in a unit or by doing double passage, tools working after tools. Such a method is unprofitable because of increased energy consumption and destruction of the soil structure as a result of double passage on the field. Beside the fact that passive with active tools have been used in a combination—for example, the milling plow or the rotary plow; but because of large energy consumption, these are not often found [or used]. Accordingly, there exists a need for a new agricultural tool which will simultaneously open and overturn the soil.

SUMMARY OF THE INVENTION

This invention attaches the cultivation unit of the soilworking machine to the tractor, allowing opening and overturning of the soil during the soilworking process in one working passage. The cultivation unit of the present invention is composed of the tillage sections, which are built with three blades, each blade joined to the common holder. The blades have a characteristic shape which is selected for displacement of soil on the surface of the blade and also to reduce energy consumption. The tillage sections are kinematically represented through the traveling speed of the machine, the direction of linear velocity, and the rotational speed and direction of vector rotary speed. All these, along with geometry of the blades work together to overturn the soil during the soilworking process. Because of this kinematic, the axis of rotation was is positioned at a 45 degree angle to the direction of linear velocity.

Power transmission of the tillage sections is transmitted from the power take off (PTO) of the tractor through gear transmission. The cultivation unit, together with a transmission, are affixed to the common frame. The frame also holds the support wheels and the fastening unit. The support wheels control depth of cultivation.

OBJECT OF THE INVENTION

The object of the present invention is a soilworking machine with adjustable kinematics and shape in a single active soilworking element, that cultivates by opening and turning the soil simultaneously. This is the result of the [agricultural] effect of the single active soilworking element to the tillage section and then to the summary effect of the cultivation unit.

BRIEF DESCRIPTION OF THE DRAWINGS

For a fuller understanding of the invention, reference is made to the following description, in connection with the accompanying drawings, in which.

DETAILED DESCRIPTION OF THE INVENTION

Figure 1:
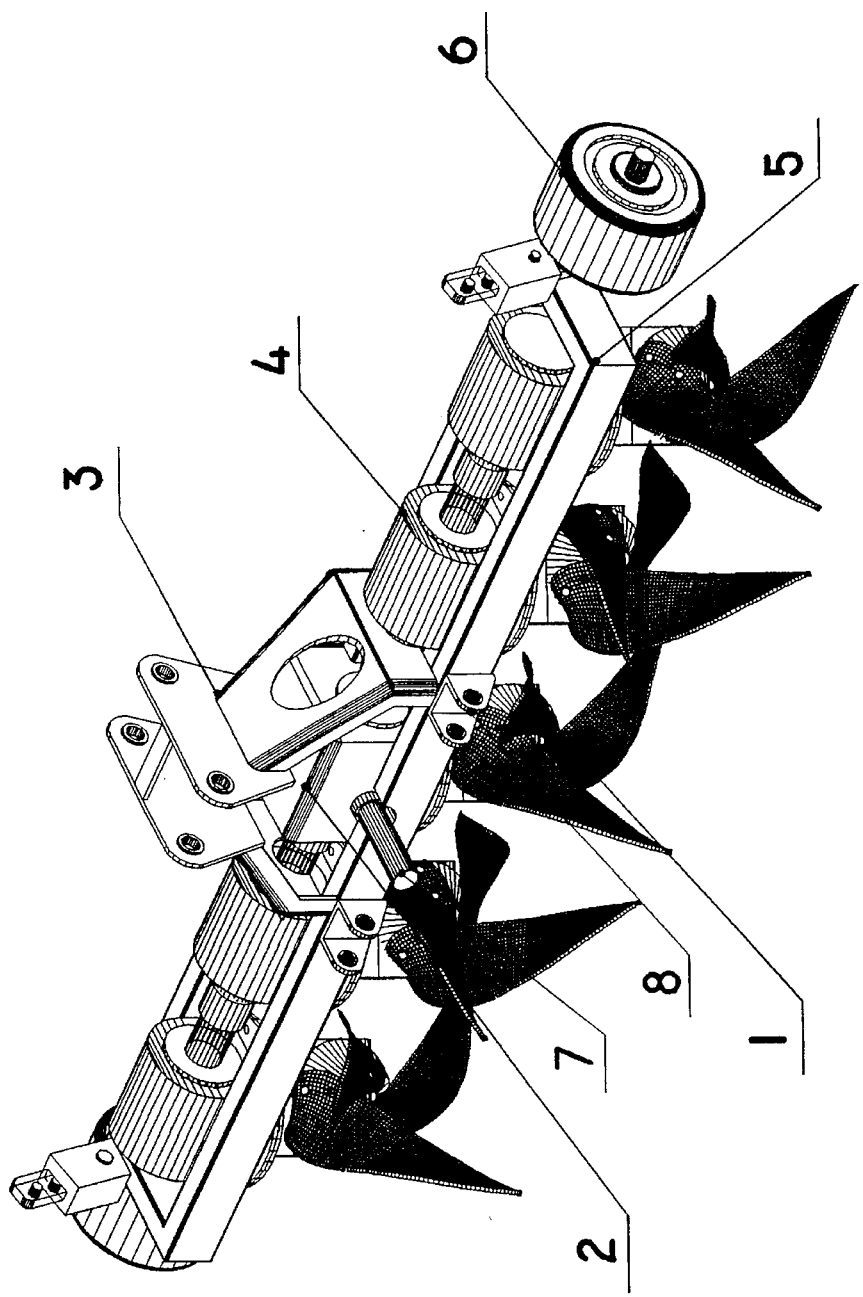
FIG. 1 is a perspective view of a the present invention in the case when the tillage sections are not situated on a common rotation axle, constructed in accordance with the invention in use.

FIG. 1 displays the fundamental unit of the present invention, cultivation unit compounded with the tillage sections 1, which are driven by the drive shaft of the power take off (PTO) 7 from the tractor, through a main gear transmission 2 and the additional gears 4. The additional gears 4 transmit rotary motion to the tillage sections 1 in a conventional manner. The transmission permits the tillage sections to rotate in the manner discussed below. All are affixed to the common frame 5, which is held down to the support wheels 6, which control depth of cultivation. The common frame is suspended from the tractor on a fastening unit, which is compounded with the stand 3 and hangers 8.

Figure 2:
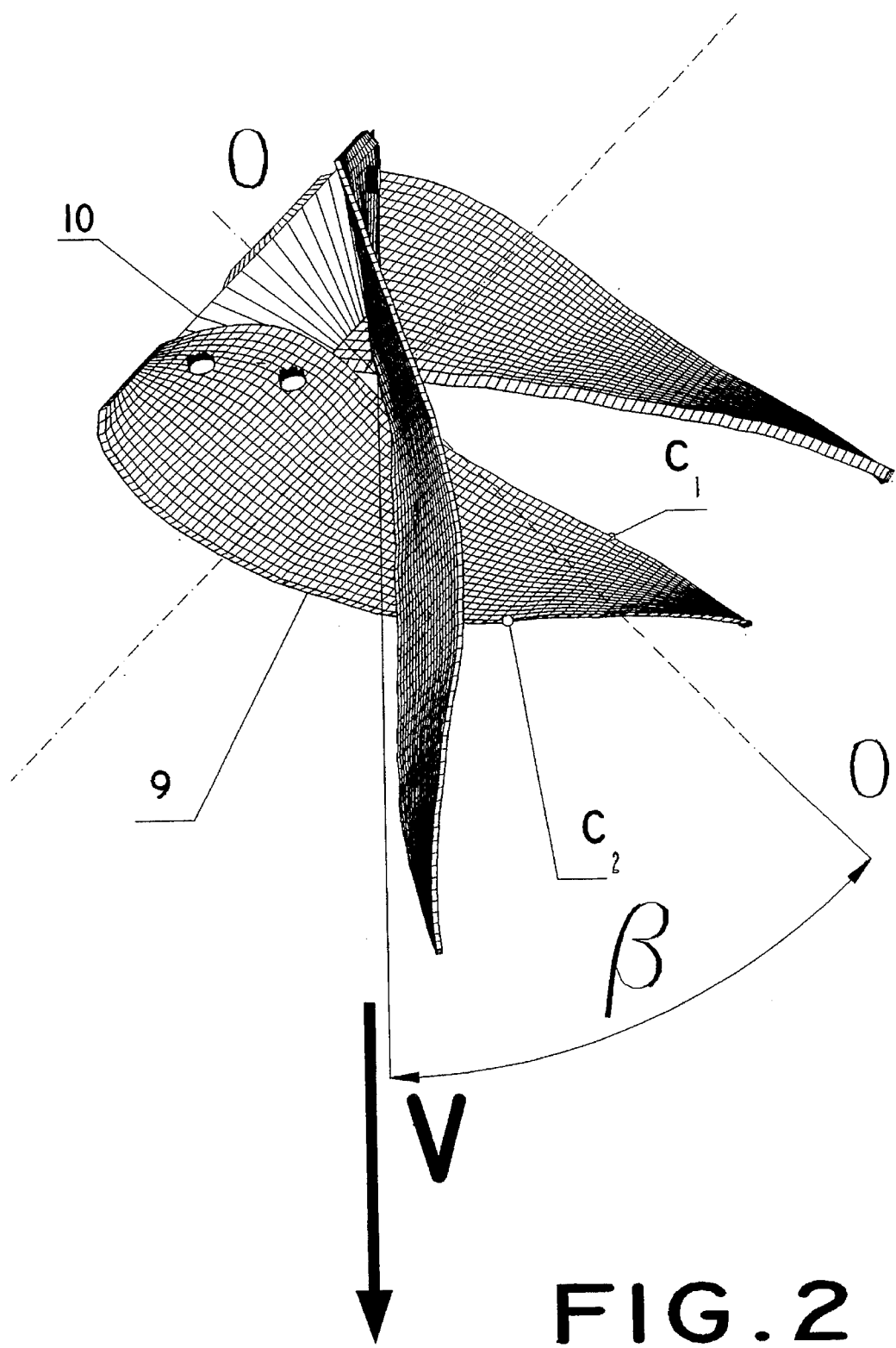
FIG. 2 is a top view of a single tillage section displaying the at-work position, constructed in accordance with the invention.
Figure 3:
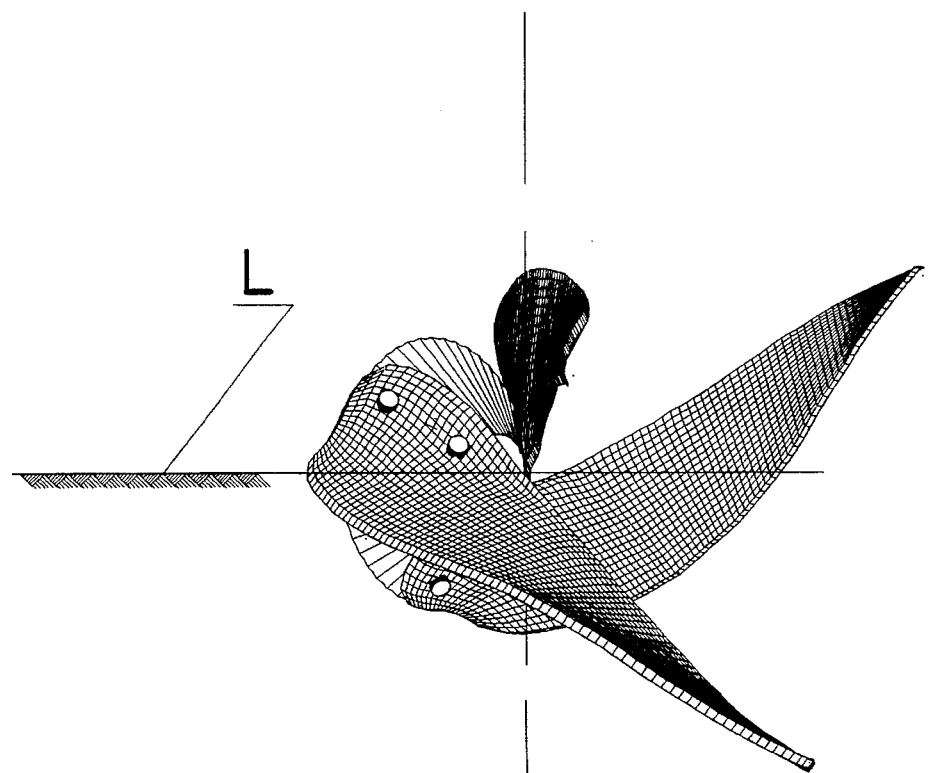
FIG. 3 is a front view of a single tillage section displaying the at-work position, constructed in accordance with the invention.
Figure 4:
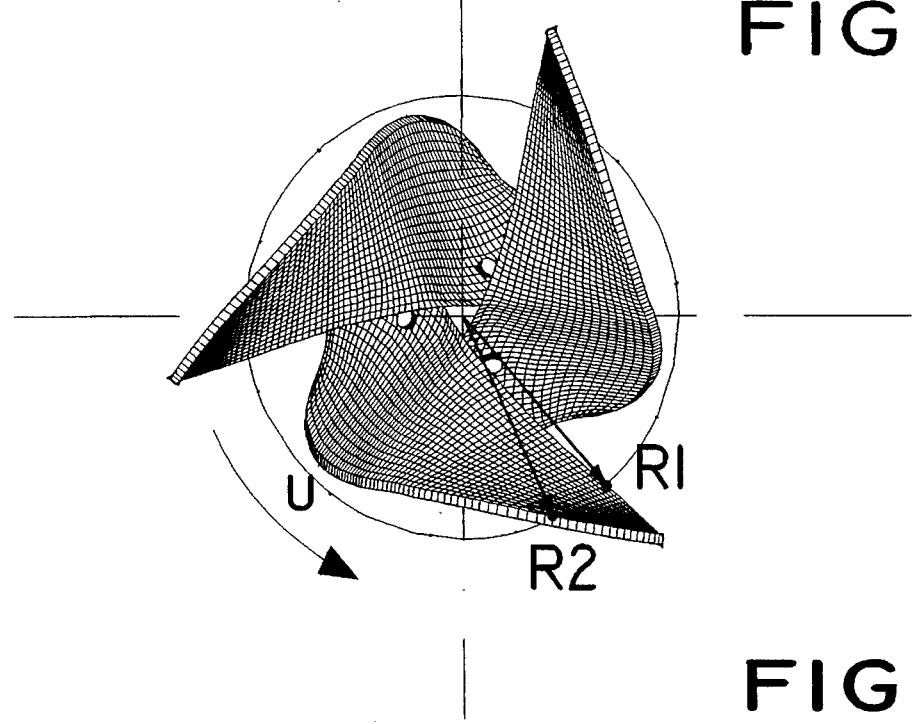
FIG. 4 is a head-on view of a single tillage section, constructed in accordance with the invention.

The tillage section is detailed in three views-a top view FIG.2, front view FIG. 3 and head-on view FIG.4. The tillage section is composed of the blades 9 connected to the holder 10 (FIG.2). The blades and holder rotate during operation of the present invention. In FIG.4 the direction of rotation is shown by a rotary speed arrow U.

The triangle-shaped blade is characterized by two edges (FIG.2), like a cutting edge C1 and a end-of-the-blade edge or trailing edge C2. Between edge C1 and edge C2 is a working surface. The working surface of the blade is twisted on ¾ of its length, twist according to the condition R1 greater than or equal to R2, where R1 and R2 (FIG.4) are the radiuses from a common rotation center, with R1 respective to the edge of C1 and R2 to the edge of C2. The radiuses are on a common cutting plane perpendicular to the axis rotation.

The holder 10 is cone shaped with angle of 90 degrees. The edge C1 of the blade affixed to the holder, drawing in space a revolution having a shape close to a 90-degree-angle cone. The holder with blades is set up in such a way that the axis of rotation 0-0 is deflected approximately angle $\beta=45°$ (FIG.2) with regard to direction of traveling speed V.

Figure 5A:
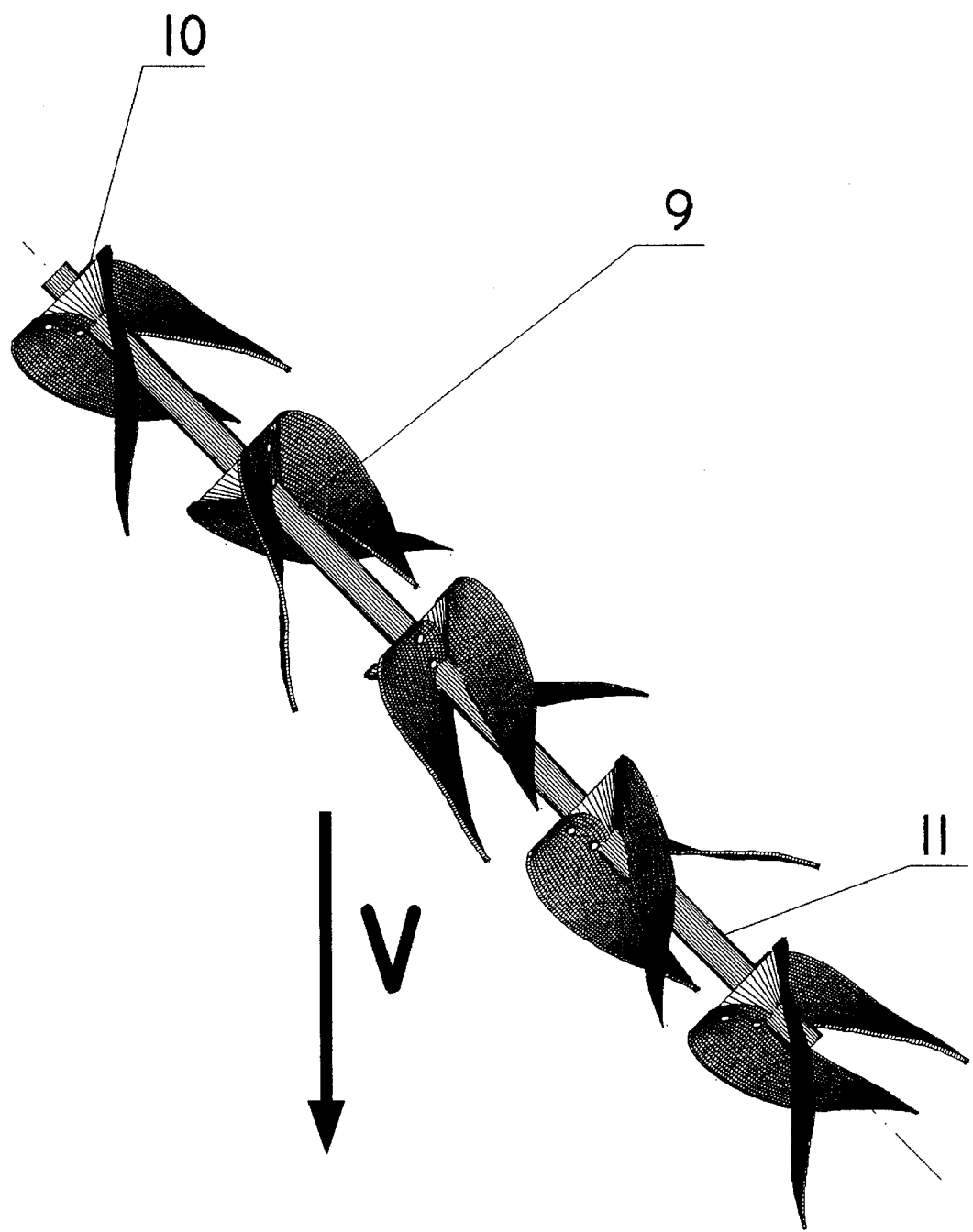
FIG. 5A is a top view of a cultivation unit when the tillage sections are situated on one common rotation axle, constructed in accordance with the invention.
Figure 5B:
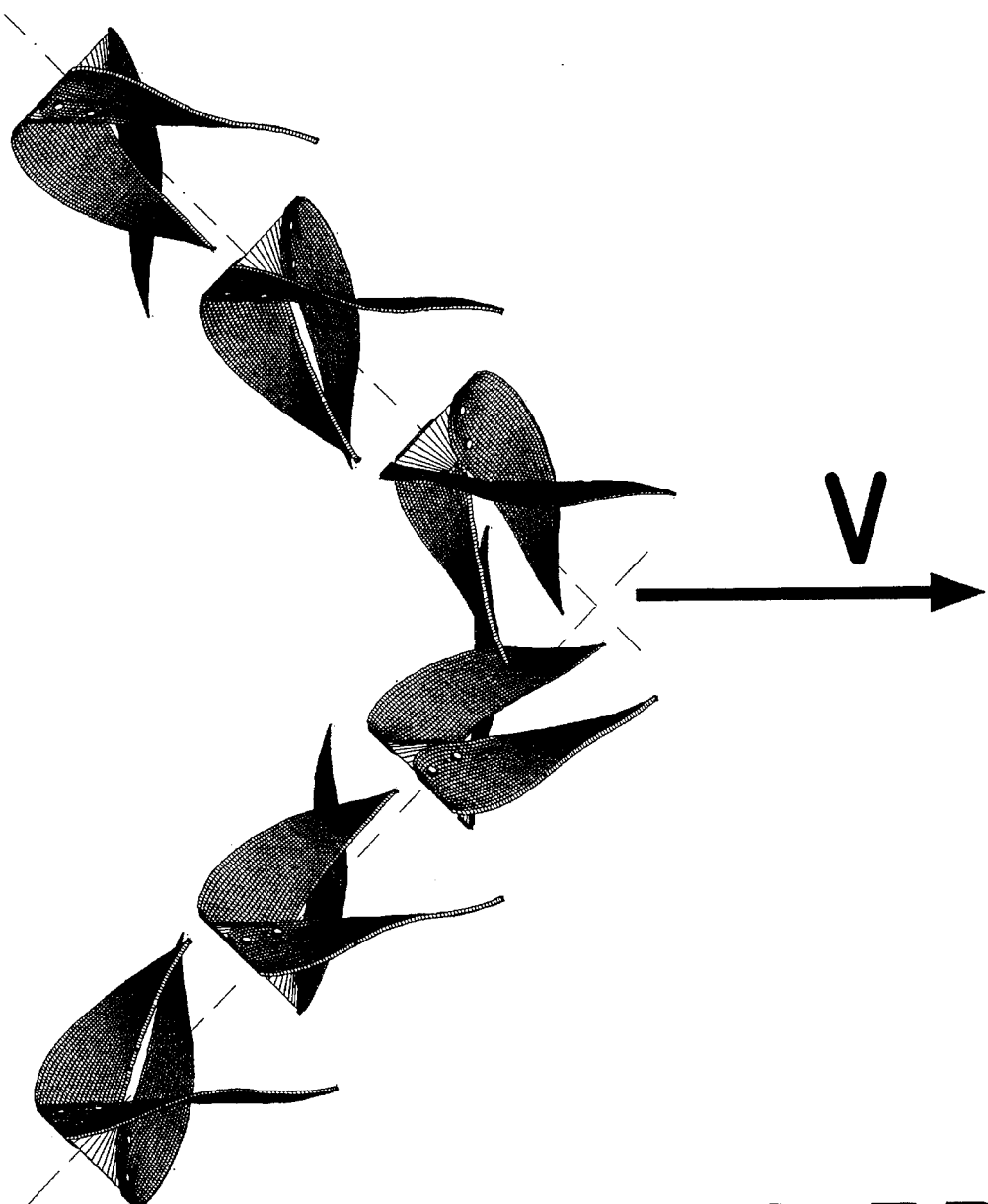
FIG. 5B is a top view of a cultivation unit when the tillage sections are situated on two common rotation axles and when axles are converge in the direction of linear velocity, constructed in accordance with the invention.
Figure 5C:
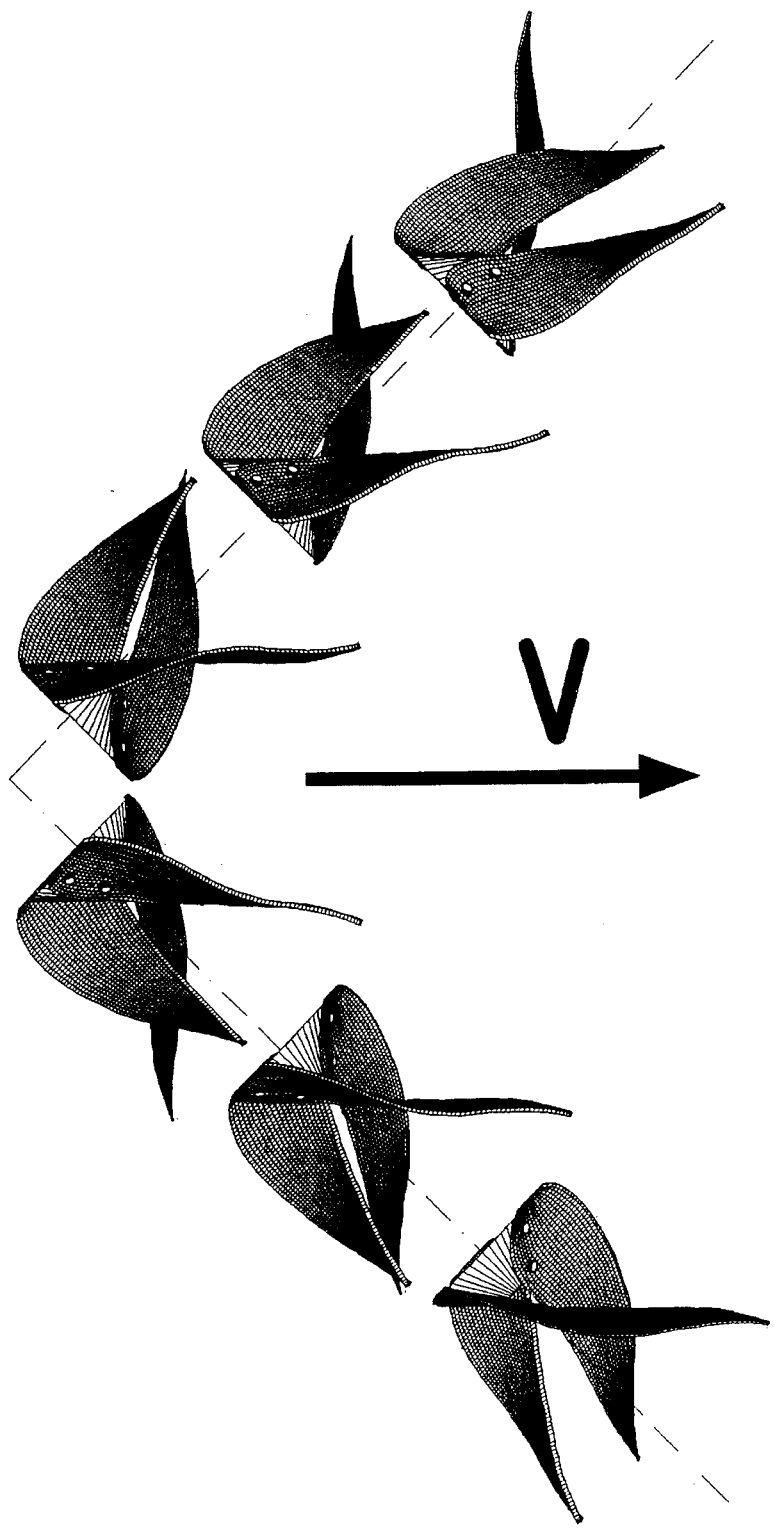
FIG. 5C is a top view of a cultivation unit when the tillage sections are situated on two common rotation axles and when axles diverge from the direction of linear velocity, constructed in accordance with the invention.

The tillage sections within the cultivation unit may be configured in various ways, as long as the sections are placed at the proper 45° angle to direction V. However there must always be the condition that the axis of rotation is deflected approximately angle β=45° with regard to vector V. Then the tillage sections may be set up in many ways—in line, perpendicular to direction of travel speed V-(FIG. 1), or in one or two lines deflected about angle 45° to direction V—FIG. 5A, FIG. 5B, FIG. 5C. The first case (FIG. 1) requires separate drives for each section, but these sections can work very deeply under level L (FIG.3) of the soil. In the second case (FIG. 5A, FIG. 5B, FIG. 5C) the sections after connection to the common pipe 11 can be driven together, but the common pipe permits deep cultivation of the soil. The tillage sections work sequentially, one after the other, according to the formula $$\alpha = \frac{2\pi}{k*z}$$

(where: α-is the angle of displacement one section after other, k- is number of tillage sections, and z- is number of blades on one section)

The holder 10, together with blades, rotates around axis of rotation 0-0 and displaces in the direction of travel speed V of machine (vector speed V ). Each blade during this motion moves on a spiral trajectory. Because the blades are contiguous to the cone shaped holder 10 and because the axis of rotation is deflected at approximately an angle of 45° to the vector of speed V, the working surface of the blades during this motion will be self-setting under a different angle to the vector V, at each change of position of the blade. The blades which start the soilworking process aspire to a parallel position with regard to the vector speed V; next they go to the next successive positions to reach the perpendicular position, which is the final soilworking process.

Figure 6:
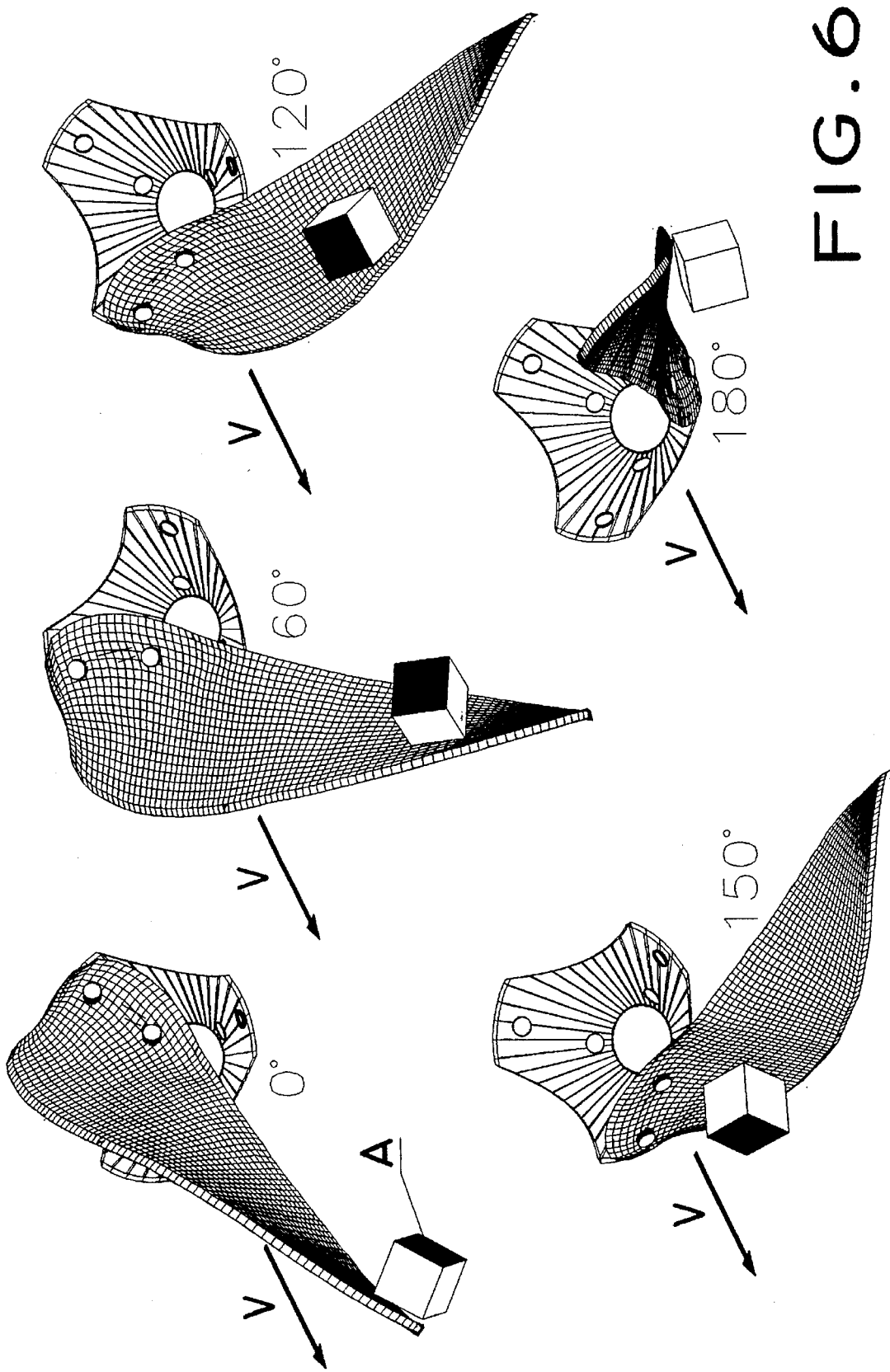
FIG. 6 displays conduction of a conventional soil element on a blade in the successive phases of blade rotation.

These rotational [blad] movements are presented in FIG.6, where an example of a blade in successive rotation demonstrates the movement of a conventional soil element A during the soilworking process.

Each panel of FIG. 6 presents the successive motion of the blade to the soil. In the phase 0° the blade goes into the soil and the working surface of the blade receives the parallel position to direction of travel speed V. Because of this parallel position, the soil is cut with minimal interaction with the working surface of the blade. The intention of such parallel positioning is to reduce the resistance of the soil to a minimum. The phase between 60° and 120° (FIG.6) the blade changes position with regard to the vector V and the working surface of blade interacts with a cutting off soil element A and the soil element displaces on the surface of the blade.

In position 150° and 180° (FIG.6), the blade reaches a perpendicular position with regard to vector speed V, dislocating and overturning a soil elements by action of the twisting work surface of the blade and inertial forces.

In such way, the first phase of the soilworking process occurs cutting off soil with minimal resistance; in the next phases occur displacement and opening of the soil, together with turning. All action results from the shape of the blade and of the kinematics, where the kinematics of the blade is represented by the value of traveling speed of the machine, the direction of linear velocity V, the rotational speed and direction of vector U rotary speed. It will be apparent to those skilled in the art that other modifications and variations can be made in the soilworking tool of the present invention without departing from the spirit of scope of the invention. Thus, it is intended that the invention cover modifications and variations of this invention, provided these come within the scope of the appended claims and their equivalents.

What is claimed:

1. A soilworking tool, comprising:
   at least one tillage section supported for rotary movement by a support frame, said at least one tillage section having a central axis of rotation permitting said at least one tillage section to rotate and work the soil, wherein said support frame supports said at least one tillage section such that said central axis of rotation is at a 45 degree angle with respect to the direction of travel of said soilworking tool; and
   a drive shaft coupled to said tillage section rotating said at least one tillage section about said central axis of rotation.

2. The soilworking tool according to claim 1, wherein said holder is cone-shaped.

3. The soilworking tool according to claim 1, wherein said at least one blade extends at a 45 degree angle with respect to said central axis of rotation.

4. The soilworking tool according to claim 1, wherein three blades are connected to said holder.

5. The soilworking tool according to claim 1, wherein said at least one blade includes a twisted working surface.

6. The soilworking tool according to claim 5, wherein said working surface is twisted on nearly ¾ of the length of said at least one blade.

7. The soilworking tool according to claim 1, wherein a plurality of tillage sections are supported by said support frame to work sequentially.

8. The soilworking tool according to claim 1, including a plurality of tillage sections, wherein said tillage sections are arranged in a line perpendicular to the direction of travel.

9. The soilworking tool according to claim 1, including a plurality of tillage sections, wherein said tillage sections are arranged in a line at approximately a 45 degree angle with respect to the direction of travel.

10. The soilworking tool according to claim 1, including a plurality of tillage sections, wherein said tillage sections are arranged in two convergent lines, wherein each line is at approximately a 45 degree angle with respect to the direction of travel.

11. The soilworking tool according to claim 7, wherein said plurality of tillage sections work sequentially according to the formula $$\alpha = \frac{2\Pi}{K*z}$$

where:
   α=the angle of displacement of one tillage section after another tillage section;
   k=the number of tillage sections; and
   z=the number of blades on each tillage section.

* * * * *